United States Patent
Cummings (10) Patent No.: US 9,791,870 B2
(45) Date of Patent: Oct. 17, 2017

(54) METHODS AND SYSTEMS FOR ENERGY BALANCE CONTROL FOR FEED FLOW AND FEED TEMPERATURE DISTURBANCES

(71) Applicant: Nestec S.A., Vevey (CH)

(72) Inventor: Daniel Louis Cummings, Fremont, MI (US)

(73) Assignee: Nestec S.A., Vevey (CH)

( * ) Notice: Subject to any disclaimer, the term of this patent is extended or adjusted under 35 U.S.C. 154(b) by 536 days.

(21) Appl. No.: 14/032,318

(22) Filed: Sep. 20, 2013

(65) Prior Publication Data

US 2014/0088787 A1    Mar. 27, 2014

Related U.S. Application Data

(60) Provisional application No. 61/704,709, filed on Sep. 24, 2012, provisional application No. 61/728,119, filed on Nov. 19, 2012.

(51) Int. Cl.
   *G06F 19/00* (2011.01)
   *G05D 23/13* (2006.01)
   (Continued)

(52) U.S. Cl.
   CPC .......... *G05D 23/132* (2013.01); *A23L 3/003* (2013.01); *A23L 3/16* (2013.01); *A23L 19/09* (2016.08); *B65B 55/12* (2013.01)

(58) Field of Classification Search
   CPC ......... G05D 23/132; A23L 3/003; A23L 3/16; A23L 1/2128
   (Continued)

(56) References Cited

U.S. PATENT DOCUMENTS 3,617,717 A  *  11/1971  Smith ............... G05B 13/0225
                                                    162/238
4,534,282 A  *   8/1985  Marinoza ............... A23C 3/076
                                                    210/764
(Continued)

FOREIGN PATENT DOCUMENTS

WO    2005011409 A1    2/2005
WO    2008093367 A1    8/2008
WO    2011143782 A1   11/2011

OTHER PUBLICATIONS

"PID Control in the Third Millennium: Lessons Learned and New Approaches", Vilanova, Visioli, Feb. 2012, Springer London, p. 458.*

(Continued)

*Primary Examiner* — Michael D Masinick
(74) *Attorney, Agent, or Firm* — Gary M. Lobel, Esq.

(57) ABSTRACT

The present disclosure provides methods and systems for mitigating finished product temperature transients caused by changes in product flow, raw product temperature, or other disturbances in an aseptic sterilization process. The methods and systems include applying an energy balance feedforward control scheme to the aseptic sterilization process to compensate for raw product temperature changes and changes in product flow. The methods and systems prevent damage to a finished product from occurring based on adverse transient temperature responses of heaters and coolers in an aseptic sterilization process.

17 Claims, 4 Drawing Sheets

(51) Int. Cl.
*B65B 55/12* (2006.01)
*A23L 3/00* (2006.01)
*A23L 3/16* (2006.01)
*A23L 19/00* (2016.01)

(58) Field of Classification Search
USPC .................................................. 700/299, 300
See application file for complete search history.

(56) References Cited

U.S. PATENT DOCUMENTS

| | | | | |
|---|---|---|---|---|
| 5,394,322 | A * | 2/1995 | Hansen | G05B 13/045 700/32 |
| 5,541,833 | A * | 7/1996 | Bristol | G05B 11/42 700/37 |
| 6,207,936 | B1 * | 3/2001 | de Waard | G05B 13/027 219/412 |
| 6,373,033 | B1 * | 4/2002 | de Waard | G05B 13/027 219/483 |
| 9,046,881 | B2 * | 6/2015 | Blevins | G05B 17/02 |
| 2003/0071594 | A1 * | 4/2003 | Kleinau | B60L 11/14 318/567 |
| 2003/0076064 | A1 * | 4/2003 | Kleinau | B62D 5/0481 318/567 |
| 2007/0006551 | A1 * | 1/2007 | Sizer | A61L 2/186 53/426 |
| 2007/0100475 | A1 * | 5/2007 | Korchinski | G05B 13/042 700/28 |
| 2007/0129917 | A1 * | 6/2007 | Blevins | G05B 17/02 703/6 |
| 2007/0208549 | A1 * | 9/2007 | Blevins | G05B 17/02 703/6 |
| 2008/0160149 | A1 * | 7/2008 | Nasrallah | A23L 1/0008 426/521 |
| 2013/0274963 | A1 * | 10/2013 | Shue | B64C 19/00 701/3 |

OTHER PUBLICATIONS

Cooper, Doug, Robert Rice, and Jeff Arbogast. "Tutorial: cascade vs. feed forward for improved disturbance rejection." Instrumentation, Systems and Automations Society, Houston, TX (2004).*

International Search Report and Written Opinion from corresponding PCT patent application No. PCT/IB2013/058702 dated Jan. 29, 2014.

* cited by examiner

METHODS AND SYSTEMS FOR ENERGY BALANCE CONTROL FOR FEED FLOW AND FEED TEMPERATURE DISTURBANCES

BACKGROUND

The present disclosure relates generally to sterilization and package filling. More specifically, the present disclosure relates to methods and systems of mitigating finished product temperature transients caused by changes in product flow and raw product temperature by applying an energy balance feedforward control scheme to aseptic sterilization processes.

Manufacturing products often involves a sterilization step. The operation of aseptic sterilizers or other sterilization processes may require variation in product flow rate to optimize the processes, balance sterilizer rates with other production steps, prevent a loss of sterility, etc. However, these variations can result in unwanted product temperature fluctuation. Other factors, such as raw product temperature, may also cause fluctuations.

Accordingly, it is desirable to minimize the temperature fluctuations through an energy balance feedforward control scheme to prevent any negative effects on the final product and reduce the need for precise temperature control of every batch of raw product.

SUMMARY

Methods and systems of minimizing variation in product temperature are provided. Methods and systems of minimizing variation in product temperature through the use of an energy balance feedforward control scheme are also provided. In an embodiment, a method of minimizing changes in finished product temperature during aseptic sterilization processes is provided. The method includes applying an energy balance feedforward control scheme to an aseptic sterilization process.

In an embodiment, the aseptic sterilization process comprises aseptic sterilization of a food product.

In an embodiment, the finished product is an adult food product.

In an embodiment, the finished product is a baby food product.

In an embodiment, the finished product is selected from the group consisting of fruits, vegetables, proteins, grains, dairy, and combinations thereof. In an embodiment, the finished product comprises vegetables.

In an embodiment, the finished product comprises only one ingredient. The finished product may be comprised of more than one ingredient. The ingredients may be sweet potatoes and carrots.

In an embodiment, the finished product is a homogenous product. The finished product may also be non-homogenous.

In an embodiment, the energy balance feedforward control scheme comprises an additive feedforward controller.

In an embodiment, the additive feedforward controller calculates steam demand from energy balance.

In an embodiment, the energy balance feedforward control scheme comprises a temperature indicating controller that provides feedback trim.

In an embodiment, the energy balance feedforward control scheme comprises a heat indicating controller.

In an embodiment, the energy balance feedforward control scheme comprises flow indication.

In an embodiment, the energy balance feedforward control scheme comprises temperature indication.

In an embodiment, the energy balance feedforward control scheme is capable of mitigating a temperature change in the finished product.

In an embodiment, the temperature change in the finished product is caused by a change in flow rate.

In an embodiment, the temperature change in the finished product is caused by a change in raw product temperature.

In an embodiment, the energy balance feedforward control scheme is applied to a heating component of the aseptic sterilization process.

In an embodiment, the heating component comprises a steam heat source.

In an embodiment, the energy balance feedforward control scheme comprises a heat source adjustment calculated from a first principles energy balance on a heater combined with an adjustment calculated by feedback temperature control.

In an embodiment, the energy balance feedforward control scheme comprises a coolant source adjustment calculated from a first principles energy balance on a coolant combined with an adjustment calculated by feedback temperature control.

In an embodiment, the energy balance feedforward control scheme is applied to a cooling component of the aseptic sterilization process.

In an embodiment, the energy balance feedforward control scheme causes a feedforward correction to reach the finished product at the same time as a disturbance through dynamic adjustment of at least one input variable.

In an embodiment, the at least one input variable is selected from the group consisting of density of the product, product flow rate, heat capacity of the product, temperature of the product, or combinations thereof.

In another embodiment, a method of reducing the impact to a finished product of variations in an aseptic processing system is provided. The method includes setting a target setting for a heat source used in an aseptic sterilization process and adjusting the target setting based on a calculation from an energy balance feedforward control system. The skilled artisan will appreciate that the target setting is the setting that will yield a final product at a temperature that is appropriate for production of the product.

In yet another embodiment, a method of reducing the impact to a finished product of variations in an aseptic processing system is provided. The method includes setting a target setting for a cooling process used in an aseptic sterilization process and adjusting the target setting based on a calculation from an energy balance feedforward control system.

In an embodiment, the adjustment to the target setting is caused by changes in product flow rate. The changes to product flow rate are triggered by a disturbance to the aseptic sterilization process selected from the group consisting of flow rate adjustment to balance product flow rate with package filling rate, adjustment to prevent loss of sterility, adjustment to address optimization processes, or combinations thereof.

In still yet another embodiment, a method of aseptic product production is provided. The method includes preparation of raw ingredients in batch tanks, deposition of batches of the ingredients into an aseptic sterilization process, passing the ingredients through a sterilizing heater and regulating temperature differences between batches using an energy balance feedforward control scheme.

In an embodiment, the aseptic sterilization process comprises aseptic sterilization of a food product.

In an embodiment, the finished product is an adult food product.

In an embodiment, the finished product is a baby food product.

In an embodiment, the finished product is selected from the group consisting of fruits, vegetables, proteins, grains, dairy, and combinations thereof. In an embodiment, the finished product comprises vegetables.

In an embodiment, the finished product comprises only one ingredient. The finished product may be comprised of more than one ingredient. The ingredients may be sweet potatoes and carrots.

In an embodiment, the finished product is a homogenous product. The finished product may also be non-homogenous.

In an embodiment, the energy balance feedforward control scheme comprises an additive feedforward controller.

In an embodiment, the additive feedforward controller calculates steam demand from energy balance.

In an embodiment, the additive feedforward controller calculates coolant demand from energy balance.

In an embodiment, the energy balance feedforward control scheme comprises a temperature indicating controller that provides feedback trim.

In an embodiment, the energy balance feedforward control scheme comprises a heat indicating controller.

In an embodiment, the energy balance feedforward control scheme comprises flow indication.

In an embodiment, the energy balance feedforward control scheme comprises temperature indication.

In an embodiment, the energy balance feedforward control scheme is capable of mitigating a temperature change in the finished product.

In an embodiment, the temperature change in the finished product is caused by a change in flow rate.

In an embodiment, the temperature change in the finished product is caused by a change in raw product temperature.

In an embodiment, the energy balance feedforward control scheme is applied to a heating component of the aseptic sterilization process.

In an embodiment, the heating component comprises a steam heat source.

In an embodiment, the energy balance feedforward control scheme comprises a heat source adjustment calculated from a first principles energy balance on a heater combined with an adjustment calculated by feedback temperature control.

In an embodiment, the energy balance feedforward control scheme is applied to a cooling component of the aseptic sterilization process.

In an embodiment, the energy balance feedforward control scheme comprises a coolant source adjustment calculated from a first principles energy balance on a coolant combined with an adjustment calculated by feedback temperature control.

In an embodiment, the energy balance feedforward control scheme causes a feedforward correction to reach the finished product at the same time as a disturbance through dynamic adjustment of at least one input variable.

In an embodiment, the at least one input variable is selected from the group consisting of density of the product, product flow rate, heat capacity of the product, temperature of the product, or combinations thereof.

In another embodiment, a food manufacturing system including a product supply, an aseptic sterilization process comprising a heat source and a sterilizing heater, and an energy balance feedforward control scheme that is applied to the aseptic sterilization process is provided.

In yet another embodiment, a food manufacturing system including a product supply, an aseptic sterilization process comprising a cooling process, and an energy balance feedforward control scheme that is applied to the aseptic sterilization process is provided.

In an embodiment, the product is an adult food product.

In an embodiment, the product is a baby food product.

In an embodiment, the product is selected from the group consisting of fruits, vegetables, proteins, grains, dairy, or combinations thereof.

In an embodiment, the product comprises only one ingredient. The product may comprise more than one ingredient. The ingredients may be sweet potato and carrot.

In an embodiment, the product is a homogenous product. It may instead be a non-homogenous product.

In an embodiment, the energy balance feedforward control scheme comprises an additive feedforward controller.

In an embodiment, the additive feedforward controller calculates steam demand from energy balance.

In an embodiment, the additive feedforward controller calculates coolant demand from energy balance.

In an embodiment, the energy balance feedforward control scheme comprises a temperature indicating controller that provides feedback trim.

In an embodiment, the energy balance feedforward control scheme comprises a heat indicating controller.

In an embodiment, the energy balance feedforward control scheme comprises flow indication.

In an embodiment, the energy balance feedforward control scheme comprises temperature indication.

In an embodiment, the heat source is a steam heat source.

In an embodiment, the energy balance feedforward control scheme causes a feedforward correction to reach the finished product at the same time as a disturbance through dynamic adjustment of at least one input variable. The at least one input variable may be selected from the group consisting of density of the product, product flow rate, heat capacity of the product, temperature of the product, or combinations thereof.

An advantage of the present disclosure is to prevent the need for precise temperature control of every batch of raw product in a manufacturing process.

Another advantage of the present disclosure is to provide a control scheme to reduce the impact of flow rate change or variations in temperature of raw materials on final product temperature.

Yet another advantage of the present disclosure is to provide a method of reducing risk to final product sterility.

Still yet another advantage of the present disclosure is to provide increased flexibility in a manufacturing process to respond to situations that require a change in flow rate.

Another advantage of the present disclosure is to provide the ability to compensate for raw product temperature changes through automatic control and thus reduce the need for precise temperature control of every batch of feed material.

Additional features and advantages are described herein, and will be apparent from the following Detailed Description and the figures.

DETAILED DESCRIPTION

As used herein, the singular forms "a," "an" and "the" include plural referents unless the context clearly dictates otherwise. Thus, for example, reference to "a polypeptide" includes a mixture of two or more polypeptides and the like.

As used herein, "about" is understood to refer to numbers in a range of numerals. Moreover, all numerical ranges herein should be understood to include all integer, whole or fractions, within the range.

Food manufacturing processes often include sterilization processes of the food product. These processes include aseptic sterilization before filling a food product into aseptic packaging. The skilled artisan will appreciate that sterilization processes may occur at various points throughout a food manufacturing process.

Sterilization is necessary for a variety of reasons. For example, in order to produce high-quality, safe, shelf-stable foods, the foods must be sterilized prior to packaging (e.g., ultra-high temperature/aseptic processes, in-container sterilization, etc.). The product should be properly sterilized to make sure that it is safe for consumption, but, at the same time, it should not be over-cooked or over-processed. Proper sterilization is thus an important step in the food manufacturing process.

Aseptic sterilization uses an aseptic sterilizer in a continuous flow process. Stopping an aseptic sterilizer during food production has serious adverse effects, including both operational and economic consequences. The skilled artisan will appreciate that this is because sterility must be maintained and/or reconfirmed before the sterilizer can again start producing usable product. This could require a sterile water flush, hot water sterilization, steam sterilization, or a complete clean-in-place cycle. All these options would cause a loss of hours of production time, costing the manufacturer time, labor, and money.

Aseptic sterilization occurs before food products are deposited into packages. Package filling machines, unlike aseptic sterilizers, are not continuous flow processes and instead are discrete devices that stop routinely for a variety of reasons. When these machines stop, a backup in production will occur, forcing the aseptic sterilizer to stop as well. To prevent the aseptic sterilizer or other continuous production from stoppage, typically there is a sterile product buffer tank located between the sterilizer and the filling machine to allow the sterilizer to operate for some time while the filling machine is stopped. Alternatively, averaging level control methods or other technologies known to a skilled artisan may be used to balance package filling rates with aseptic sterilizer flow rates.

The skilled artisan will appreciate that methods of balancing packaging rates with aseptic sterilization flow rates may often involve variations in product flowrate. The skilled artisan will also appreciate that variations in flow rate will occur for reasons other than balancing sterilizer flow rates and packaging rates. Flow manipulation also may result from other process optimizations. Additionally, flow manipulation may be necessary to address upsets that risk loss of sterility.

However, flow manipulation, or varying product flow rate, is typically not desirable as it can cause negative consequences to the final product. For example, flow manipulation results in unwanted changes to product temperature.

Applicants have surprisingly found that applying an energy balance feedforward control scheme to aseptic sterilization can minimize adverse transient temperature fluctuations. For example, the energy balance feedforward control scheme can minimize the adverse transient temperature response of the heaters in an aseptic process. The energy balance feedforward control scheme can minimize the adverse transient temperature response of coolant in a cooling process as well.

The control technique of feedforward energy balance is established practice in other industries. However, feedforward energy balance control schemes have not been applied to aseptic sterilization because the typical processing line is designed for only a few products and is relatively inflexible due to a lack of instrumentation required to implement this control scheme. The presently disclosed methods provide an efficient way to mitigate adverse transient temperature responses by providing energy balance for feed flow and feed temperature disturbances in aseptic sterilization. The application of a feedforward energy balance control scheme to aseptic sterilization processes may be implemented to prevent temperature fluctuation during heating processes. The skilled artisan will appreciate that the control scheme may be extended to the cooling section of the process as well.

The energy balance feedforward control scheme can mitigate the adverse transient temperature responses due to feed flow and/or feed temperature changes. The skilled artisan will appreciate that, like feed flow rate changes, feed temperature changes may occur for a variety of reasons as well. In an embodiment, differences in raw product temperature can be a cause of temperature change. The nature of aseptic product production creates a situation in which unwanted temperature variation could occur.

Production of aseptic products involves a kitchen and an aseptic sterilizer. The kitchen prepares batches of raw ingredients that are fed to the sterilizer. As each batch tank is drained, the process switches to the next batch tank which may or may not be at the same temperature as the previous tank. Any difference in temperature will cause an upset in the product temperature as it passes through the sterilization heaters. This is a common concern in aseptic processing. Applying a feedforward control scheme to aseptic processing reduces the impact on finished product temperature and the risk to sterility.

In an embodiment, an energy balance feedforward control scheme is applied to aseptic sterilization to mitigate finished product temperature transients caused by changes in product flow and raw product temperature. The aseptic sterilization process may include sterilizing heaters. The application of the energy balance feedforward control system to the aseptic sterilization process minimizes the adverse transient temperature response of the heaters or coolants in the aseptic process due to feed flow and/or feed temperature changes.

The skilled artisan will appreciate that the heat source in the heaters may be any appropriate heat source known in the art. The same concept of use of an energy balance feedforward control system in conjunction with aseptic sterilization applies to any heat source with the necessary instrumentation. The heat source may be a steam heat source or an electrical heat source. In an embodiment, the heat source is a steam heat source. The concept also applies to the cooling processes. The skilled artisan will appreciate that any coolant and coolant source known in the art may be used with the energy balance feedforward control system.

The feedforward energy balance control scheme to manage temperature fluctuation includes a process of target setting for the heat source or coolant source. The target setting for the heat source to the sterilizing heater, or for the coolant source is manipulated by feedforward control to minimize product temperature transients in the event that there is a change of product flow and/or product feed temperature.

Figure 1:
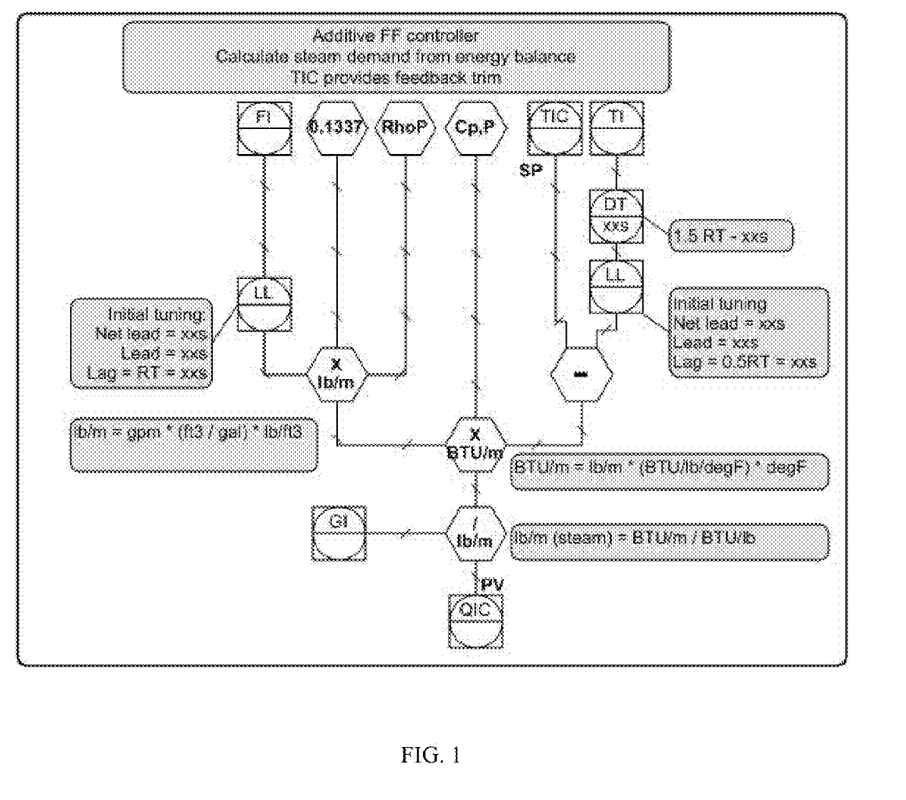
FIG. 1 illustrates a block diagram of the energy balance feedforward control scheme in accordance with an embodiment of the present disclosure.

FIG. 1 illustrates a block diagram of a steam based energy balance feedforward control scheme. In an embodiment, the feedforward energy balance control scheme includes an additive feedforward controller portion and a feedback trim portion that provides additional control over the scheme. The additive feedforward controller calculates steam demand from energy balance. The additive feedforward controller also includes input variables such as product density (RhoP) and the heat capacity of the product (Cp,P) as well as information from the flow indication (FI). The feedforward controller mitigates disturbance in flow that could cause negative temperature fluctuations in a finished product. The scheme also includes a calculated general inputheating value (GI) and a heat indicating controller (QIC) that, in an embodiment, as shown in FIG. 1, controls a steam heat source based on the calculated steam demand from the energy balance feedforward control scheme. As also shown in FIG. 1, in an embodiment, the disturbance in flow is measured along with product characteristics, multiplied by feedforward gain, and passed through lead-lag (LL) blocks for dynamic compensation. Energy balance feedforward control schemes provide the ability to cause preemptive correction of any measurable disturbance.

The feedback trim portion of the feedforward control scheme includes a temperature indicating controller (TIC) and temperature indication (TI). Dynamic compensation occurs in the raw product temperature portion as well, including passage through lead-lag blocks and deadtime (DT). The combined action of the feedback trim portion with the additive feedforward controller allows for better management of variability in the control scheme than a pure feedforward system without feedback trim would allow.

The skilled artisan will appreciate that energy balance feedforward control systems can be applied to compensate for flow, pressure, temperature, etc. upsets before they have a significant effect on product quality. In an embodiment, the feedforward energy balance control scheme compensates for variations in temperature. Feedforward control schemes can be used to preemptively move a process to match the flows and other conditions in a process for any given product. The control schemes help to prevent damage from occurring to a product from unexpected disturbances in production processes. In an embodiment, the processes involve aseptic sterilization and the product produced is a food product.

The product produced may be an adult food product or a baby food product. It may be a product for feeding pets or other animals. The food product may be any known fruits, vegetables, grains, meats, or dairy. In an embodiment, the food product is sweet potato and carrot. In another embodiment, the food product is a grain. The methods may be extended beyond pure food products. In an embodiment, the methods and process are employed by pharmaceutical or nutraceutical manufacturers as well.

The energy balance feedforward control scheme used in conjunction with aseptic sterilization may also be applied to homogenous and non-homogenous products. In an embodiment, the scheme is applied to homogenous products. The skilled artisan will appreciate that the scheme may be used with products having a variety of textures. In an embodiment, the product is pureed. The product may instead be whole, chopped, or otherwise processed.

Energy balance feedforward control schemes may involve target setting for a heat source to a sterilizing heater or for a coolant and coolant source that is part of an aseptic sterilization process. In an embodiment, the target setting for the heat source to the sterilizing heater or the coolant and coolant source is manipulated by feedforward control to minimize product temperature transients in the event that there is a change of product flow and/or product feed temperature. The heat or coolant source adjustment involved in the energy balance feedforward control scheme is calculated from a first principles energy balance on the heater and combined with the adjustment calculated by feedback temperature control. The input variables to the calculation undergo a dynamic adjustment so that the feedforward correction reaches the product at the same time as the disturbance, cancelling the impact of that disturbance.

The ability to compensate for feed flow changes through automatic control allows for increased flexibility in response to situations that may require a change in flow rate such as the risk of loss of sterility or intentional flow changes to achieve other process optimizations. The ability to compensate for raw product temperature changes through automatic control reduces the need for precise temperature control of every batch of feed material.

By way of example and not limitation, the following examples are illustrative of various embodiments of the present disclosure. The formulations and processes below are provided for exemplification only, and they can be modified by the skilled artisan to the necessary extent, depending on the special features that are desired.

Figure 2:
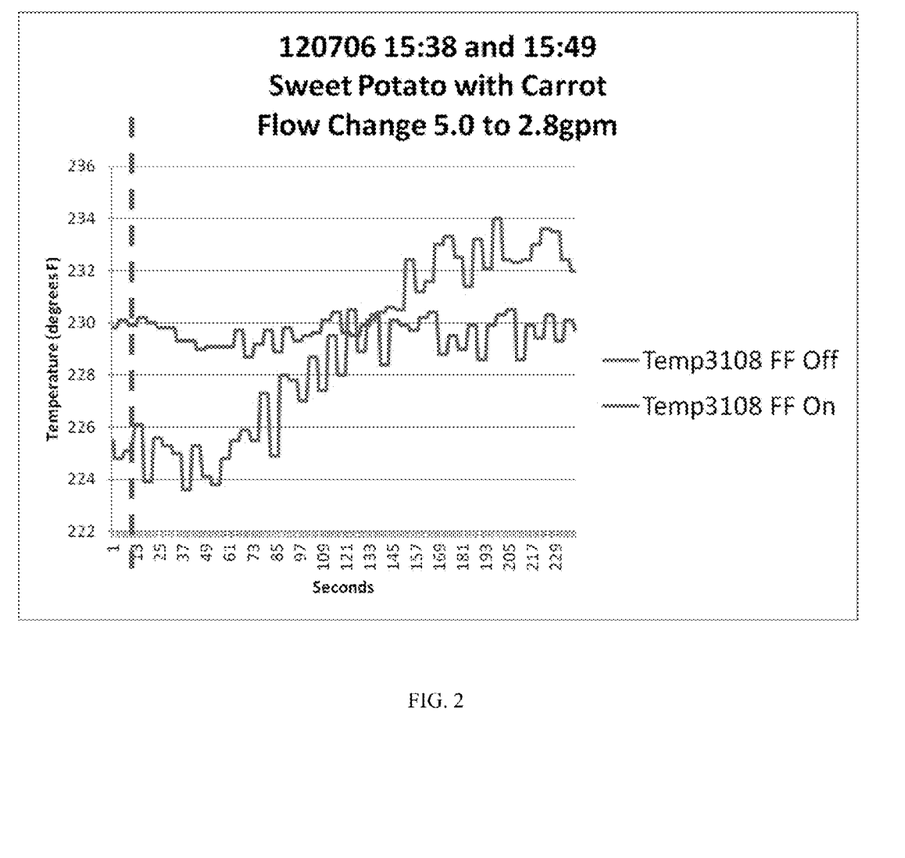
FIG. 2 illustrates test results from an experimental run using sweet potato with carrots demonstrating the trends for product temperature response to a sudden flow change, contrasting the change in trend from flow change with the feedforward control system off, versus when flow change when the system was on, in accordance with an embodiment of the present disclosure.

Example 1—Test Run of an Energy Balance FeedForward Control Scheme Applied to an Aseptic Sterilization Process Using Sweet Potato and Carrot The beneficial effect of an energy balance feedforward control scheme on the mitigation of a temperature change of a final product caused by a change in flow rate was demonstrated using sweet potato and carrot. The product was run for approximately 230 seconds through a sterilization system twice, and each time a sudden flow change was imposed on the system. The flow change was imposed under identical conditions, except that for one run, the energy balance feedforward control scheme was off, and for the other, the energy balance feedforward control scheme was on. FIG. 2 shows the time-aligned results of the test. The vertical line identifies the moment of the flow change. When the flow was decreased from 5.0 to 2.8 gpm, without the energy balance feedforward control scheme the temperature of the sweet potato and carrot rose drastically, from approximately 226 to 234 degrees. By contrast, when the same flow change was imposed with the energy balance feedforward control scheme on, the temperature did not drastically change, remaining steady at approximately 230 degrees.

Figure 3:
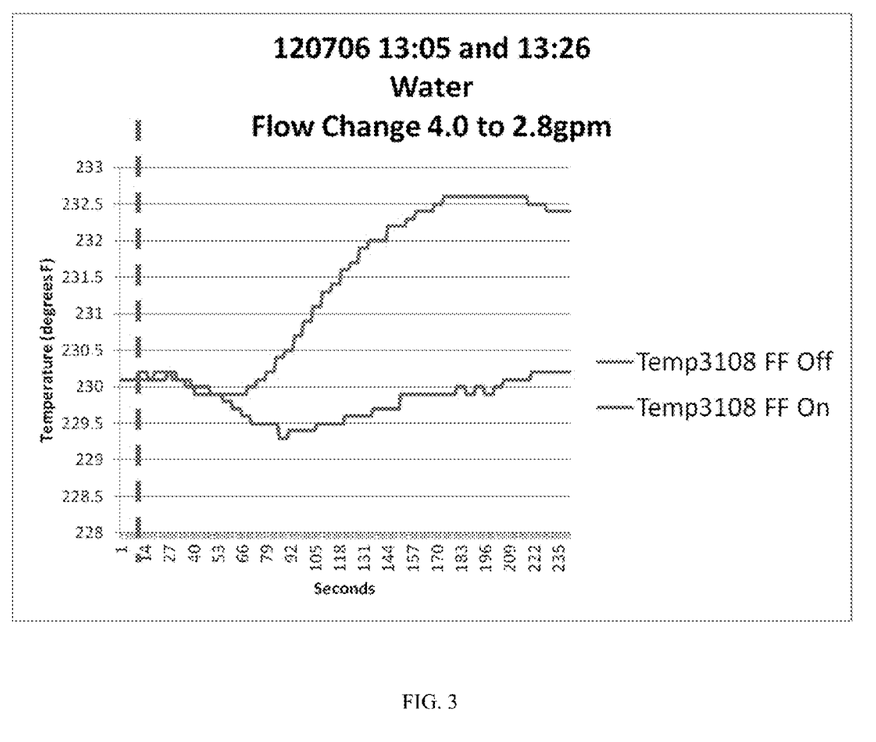
FIG. 3 illustrates test results from an experimental run using water demonstrating the trends for product temperature response to a sudden decrease in flow, contrasting the change in trend from when the feedforward control system was off, versus when it was on, in accordance with an embodiment of the present disclosure.

Example 2—Test Run of an Energy Balance FeedForward Control Scheme Applied to an Aseptic Sterilization Process Using Water with a Decrease in Flow A similar experiment was conducted to demonstrate the beneficial effect of an energy balance feedforward control scheme on the mitigation of a temperature change of a final product caused by a change in flow rate using water as the product in the system. FIG. 3 shows the results of the experiment. Like FIG. 2, the graph shows the difference in product temperature after a flow change when the energy balance feedforward control scheme is on versus when it is off. The flow was decreased from 4.0 to 2.8 gpm. With the control scheme off, the temperature rose over the course of the 235 second run from approximately 230 to 232.5 degrees. With the control scheme on, the temperature remained close to 230 degrees throughout the time frame.

Figure 4:
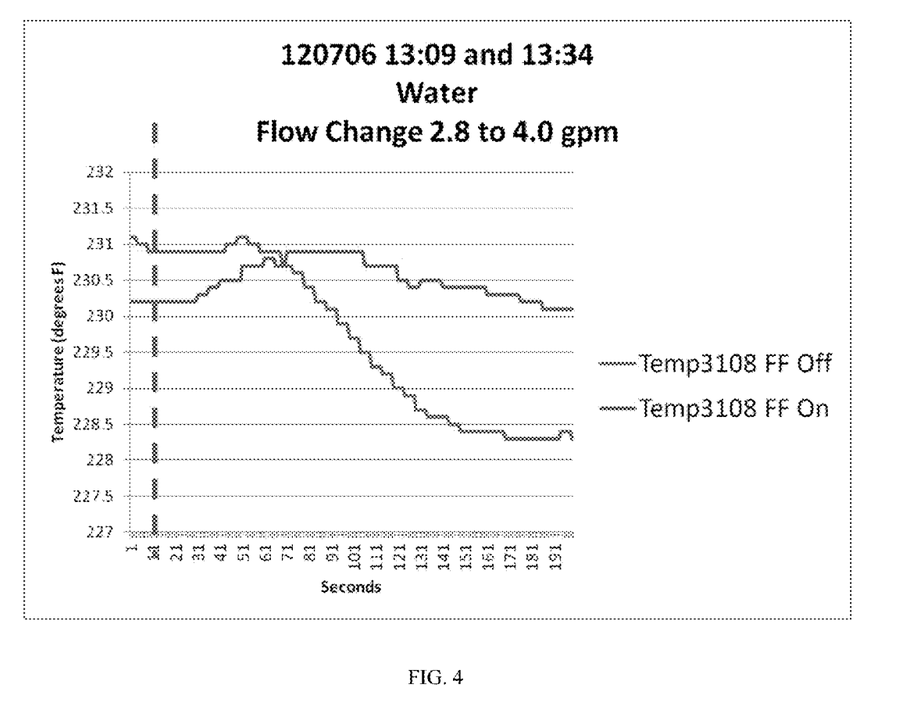
FIG. 4 illustrates test results from an experimental run using water demonstrating the trends for product temperature response to a sudden increase in flow, contrasting the change in trend from when the feedforward control system was off, versus when it was on, in accordance with an embodiment of the present disclosure.

Example 3—Test Run of an Energy Balance FeedForward Control Scheme Applied to an Aseptic Sterilization Process Using Water with an Increase in Flow FIG. 4 shows the results of an experiment similar to FIG. 2. A test run of an energy balance feedforward control scheme used in conjunction with a sterilizing process was run using water. A flow change was imposed on the system. The change was imposed once with the energy balance feedforward control scheme on, and once with the control scheme off. The flow was increased from 2.8 to 4.0 gpm. FIG. 4 demonstrates that the control scheme works to maintain a more constant temperature, even when the flow rate is increased instead of decreased. With the control scheme off, in 191 seconds the water temperature decreased from approximately 230 to 228.5 degrees. With the control scheme on, the water temperature remained between approximately 230 and 231 degrees.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of minimizing changes in finished product temperature during aseptic sterilization processes, the method comprising:
applying an energy balance feedforward control scheme to an aseptic sterilization process,
wherein the energy balance feedforward control scheme comprises:
an additive feedforward controller including the input variables density of the product, heat capacity of the product, and flow indication information; and
a heat source adjustment calculated from a first principles energy balance on a heater combined with an adjustment calculated by feedback temperature control.

2. The method according to claim 1, wherein the finished product is a baby food product.

3. The method according to claim 1, wherein the finished product is a non-homogenous food product.

4. The method according to claim 1, wherein the additive feedforward controller calculates steam demand from energy balance.

5. The method according to claim 1, wherein the additive feedforward controller calculates coolant demand from energy balance.

6. The method according to claim 1, wherein the energy balance feedforward control scheme comprises a temperature indicating controller that provides feedback trim.

7. The method according to claim 1, wherein the energy balance feedforward control scheme comprises a heat indicating controller.

8. The method according to claim 1, wherein the energy balance feedforward control scheme comprises flow indication.

9. The method according to claim 1, wherein the energy balance feedforward control scheme comprises temperature indication.

10. The method according to claim 1, wherein the energy balance feedforward control scheme is applied to a heating component of the aseptic sterilization process.

11. The method according to claim 1, wherein the energy balance feedforward control scheme is applied to a cooling component of the aseptic sterilization process.

12. The method according to claim 1, wherein the energy balance feedforward control scheme comprises a coolant source adjustment calculated from a first principles energy balance on a coolant combined with an adjustment calculated by feedback temperature control.

13. The method according to claim 1, wherein the impact to a finished product of variations in an aseptic processing system is reduced.

14. A method of aseptic product production, the method comprising:
preparation of raw ingredients in batch tanks;
deposition of batches of the ingredients into an aseptic sterilization process;
passing the ingredients through a sterilizing heater; and
minimizing changes in finished product temperature during aseptic sterilization processes by regulating temperature differences between batches using an energy balance feedforward control scheme, including:
an additive feedforward controller including the input variables density of the product, heat capacity of the product, and flow indication information; and
a heat source adjustment calculated from a first principles energy balance on a heater combined with an adjustment calculated by feedback temperature control.

15. The method according to claim 14, wherein the minimizing changes in finished product temperature during aseptic sterilization processes is selected from the group of methods consisting of those claimed in any one of claims 1 to 3, 4 to 10, 11, 12 and 13.

16. A food manufacturing system comprising:
a product supply;
a process for minimizing changes in finished product temperature during aseptic sterilization process comprising a heat source and a sterilizing heater; and
an energy balance feedforward control scheme that is applied to the aseptic sterilization process, wherein the energy balance feedforward control scheme includes:

an additive feedforward controller including the input variables density of the product, heat capacity of the product, and flow indication information; and a heat source adjustment calculated from a first principles energy balance on a heater combined with an adjustment calculated by feedback temperature control.

17. The system according to claim 16, wherein the minimizing changes in finished product temperature during aseptic sterilization processes is selected from the group of methods consisting of those claimed in any one of claims 1 to 3, 4 to 10, 11, 12 and 13.

\* \* \* \* \*